United States Patent Office 3,521,971
Patented July 28, 1970

3,521,971
METHOD AND APPARATUS FOR
CONTROLLING AIRCRAFT
Marvin C. Cheney, Jr., Glastonbury, Conn., assignor to
United Aircraft Corporation, East Hartford, Conn., a
corporation of Delaware
Filed July 17, 1968, Ser. No. 745,641
Int. Cl. B64c 27/10
U.S. Cl. 416—1                                    24 Claims

ABSTRACT OF THE DISCLOSURE

This invention relates to aircraft, particularly helicopters, having two counterrotating thrust producing rotors with rigidly mounted blades. The blades of these rotors are subjected to gyroscopic precession moments during aircraft attitude changes which tilt the rotor axes. In order to reduce blade stress and blade tip deflection during maneuvers, a cyclic pitch variation is imposed on the blades of each rotor to generate an aerodynamic moment on the rotors which will oppose and preferably cancel the gyroscopic precession moments. The opposing cyclic pitch command can be coupled with a primary cyclic pitch command, which causes the attitude change, by means of the rotor control mechanisms.

BACKGROUND OF THE INVENTION

This invention relates to aircraft such as helicopters which have two counterrotating rotors with rigidly mounted blades.

In the past, aircraft rotors have had what is called a hinged rotor system in view of the pivotable connections that have been employed in connecting rotor blades to the rotor head or hub. The gimbaled rotor head such as shown in U.S. Pat. No. 2,980,186 is typical of one type of hinged rotor the teetering rotor head such as shown in U.S. Pat. No. 3,370,809 is typical of another type and the articulated rotor system such as seen in U.S. Pat. No. 3,310,120 is typical of another hinged rotor. The hinged attachment in each case relieves a large portion of the cyclic blade stresses which are generated by control loads imposed on the rotor system. More recently the hingeless rotor system has come into use. In the hingeless or rigid rotors the blades are attached to the rotor shaft by straps or stiff connections which provide a comparatively limited degree of flexibility.

All rotors obey the principles of a gyroscope in that a gyroscopic precession moment operates upon the rotor in a plane perpendicular to the plane in which a torque is applied to tilt the rotor axis. Hinged rotor systems which employ cyclic pitch for tilting the rotor thrust vector depend upon the gyroscopic principle for changing the direction of the thrust vector to control aircraft motions. In the rigid rotor systems, the gyroscopic principles still apply; however, since lift vectors can be sustained on the rigid rotors at positions substantially offset from the rotor axis, it is possible to generate aerodynamic control moments directly from aerodynamic forces on the blades without reliance upon the precession moments as required by hinged rotors. When the aerodynamic moments are employed for direct control of the aircraft, the gyroscopic precession moments created by the resulting aircraft motion still operate in a plane perpendicular to the plane of the control moments and the desired attitude change.

In tandem, side-by-side, or coaxial rotor systems with counterrotating rigid rotors, the gyroscopic moments created by the aircraft motion are equal and opposite, therefore, the gyroscopic moments cancel each other without affecting the aircraft motion. These gyroscopic moments, however, add to the cyclic stress imposed on the blades and create blade deflections. Neither the additional cyclic stress nor the blade deflections are desirable. The stresses may require heavier blades to maintain a reasonable life expectancy. The blade deflections may require increased separation distances between coaxial counterrotating rotors to avoid blade interference. Small rotor separation without blade closure problems is desirable to reduce aerodynamic drag. The reduction of blade deflections and the cyclic stresses will permit the rotor systems to be smaller and lighter with longer blade life.

SUMMARY OF THE INVENTION

This invention relates to the elimination of the undesirable blade stresses and blade deflections caused by the gyroscopic precession moments. The rotor system in which the invention is incorporated employs counterrotating rotors having rigidly attached, variable pitch blades. The blades are controlled by swashplates which permit the imposition of cyclic pitch variations on the blades to generate aerodynamic control moments for directly generating aircraft motions and other aerodynamic moments for opposing or cancelling the gyroscopic precession moments associated with the aircraft motions. The aircraft motions may be generated by the rotors or by additional aircraft control surfaces in the case of a compound aircraft having both rotors and fixed control surfaces.

In one embodiment of the invention in which the rotor control system produces the aircraft motions, the aerodynamic control and cancelling moments are generated by cross-coupling the longitudinal and lateral cyclic pitch commands for the rotors. This means that when the pilot initiates a command to roll the aircraft, a corresponding command is automatically generated by the cross-coupling feature to introduce a pitching or longitudinal cyclic command which is applied simultaneously to the rotors. Conversely, if the pilot initiates a command to pitch the aircraft fore or aft, a roll or lateral cyclic command is simultaneously generated.

It is a well known fact that the gyroscopic precession moments operate on the rotor in a plane rotated 90° in the direction of blade rotation from the point of application of the aerodynamic forces. It is for this reason that the coupling of a cyclic pitch command having an azimuthal characteristic, e.g., lateral or longitudinal or any intermediate azimuth, displaced 90° from the given command will produce an aerodynamic moment to cancel the gyroscopic precession moment. The precession moments on counterrotating rotors are equal and opposite. The coupled commands must therefore be equal and opposite and together are called a differential cyclic pitch command.

The cross-coupling factor for longitudinal and lateral cyclic pitch commands is substantially a constant of proportionality and has been shown to be approximately equal to:

$$4m_0 K/\rho R c a I$$

where
$m$ is the blade mass per unit span length, $m_0$ being the mass per unit length of the blade root;

$$K = \int_0^R \frac{m}{m_0} \gamma_w \frac{r}{R^2} dr$$

$\gamma_w$ is the variation of blade deflection with radius in the first blade bending mode,
R is the rotor radius,
$\rho$ is the air density, $c$ is the blade chord at 0.75R,
$a$ is the blade section lift curve slope, and $$I = \int_0^R \gamma_w \frac{r^2}{R^3}$$

In order to introduce the reciprocal, cross-coupling of cyclic pitch commands, it is possible in one embodiment of the invention to provide a special mixing linkage between the pilot's control member and the swashplates for each rotor which automatically provides the cross-coupling according to the preselected proportions. In another embodiment, the cross-coupling is achieved by connecting the respective swashplates and rotor blades together with a pre-established phase angle between the pitching or rolling swashplate input and the rotor blade push rod producing a pure pitch or roll moment, respectively. This phase angle is equal to an angle whose tangent is equal to the preselected coupling proportion.

A trim control is differentially included in the aircraft control linkages having inherent cross-coupling features for varying the lateral and longitudinal cyclic pitch commands independently.

DESCRIPTION OF THE PREFERRED EMBODIMENTS

Figure 1:
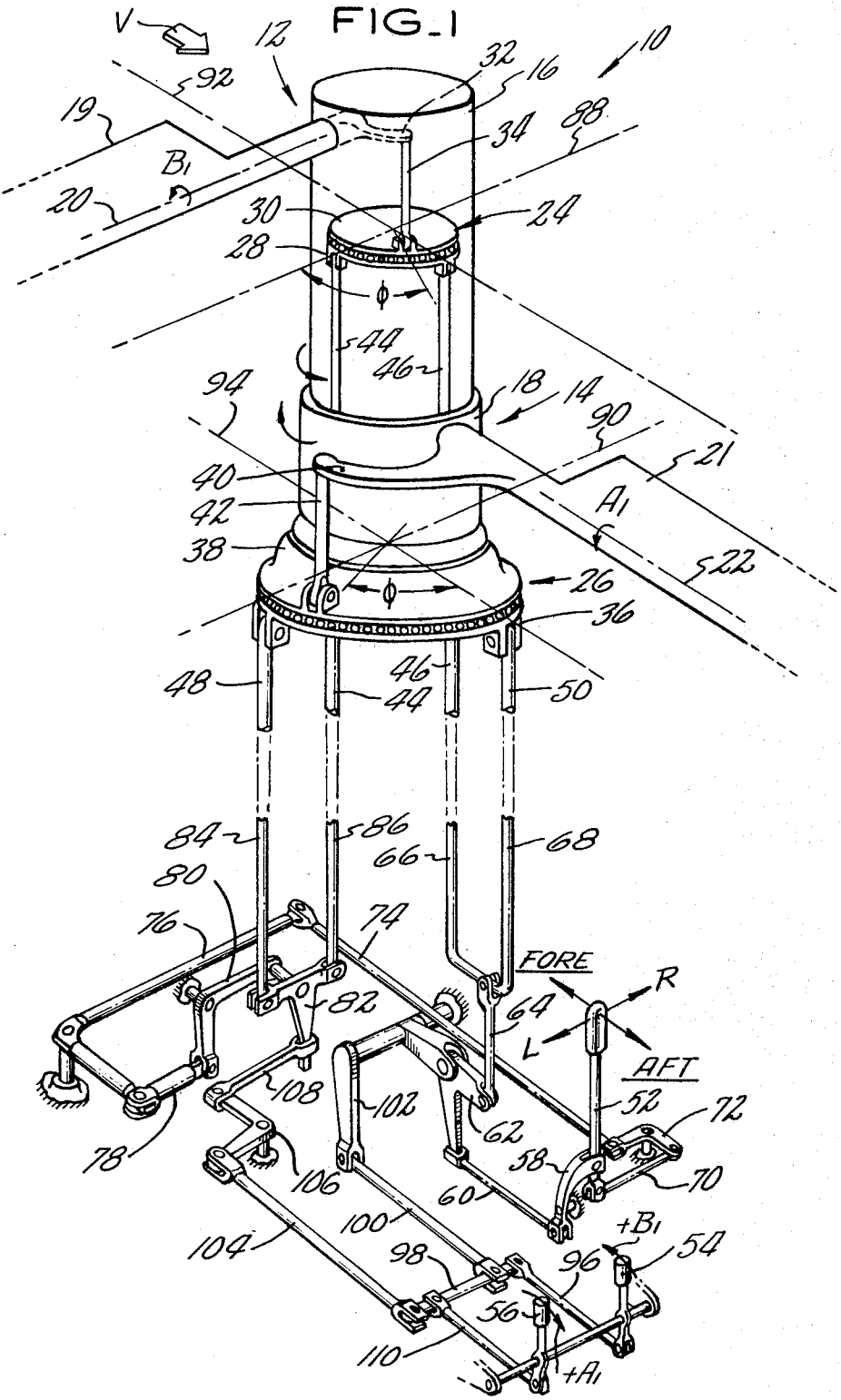
FIG. 1 is a simplified representation of a coaxial rotor system having counterrotating blades which are connected to the respective swashplates with a prescribed phase relationship to introduce the cross-coupling factor.

Reference to FIG. 1 will disclose a schematic representation of two counterrotating rigid rotors to which the invention may be applied. The rigid rotor system is generally designated 10 and includes an upper rotor 12 and a lower rotor 14. The heavy arrow V indicates the relative velocity of the air with respect to rotor system 10 in forward flight. The upper rotor 12 rotates in counterclockwise fashion as viewed from above and the lower rotor 14 rotates in the clockwise direction as viewed from above. Each of the rotors 12 and 14 has a plurality of rigidly mounted blades 19 and 21 respectively connected directly to the coaxial rotor shafts 16 and 18, respectively, although only one blade has been shown on each rotor for simplicity. Each of the rotor blades is mounted for pitch changing motion about a feathering axis 20 and 22, respectively. A conventional swashplate 24 and 26 respectively is provided for each rotor to change the blade pitch both cyclically and collectively. Swashplate 24 includes stationary member 28 and a member 30 which rotates with rotor 12. Interposed between each of the blades 19 of rotor 12 and the rotating member 30 is a pitch change horn 32 and push rod 34 to transmit the cyclic and collective pitch commands from the swashplate 24. Similarly, swashplate 26 includes a stationary member 36 and a member 38 which rotates with rotor 14. Interposed between each of the blades 21 of rotor 14 and the rotating member 38 is a pitch change horn 40 and push rod 42.

Control rods 44 and 46 are connected to the stationary member 28 of upper swashplate 24 to transmit the cyclic and collective commands from the pilot to the upper rotor 12. Additional control rods operating in conjunction with rods 44 and 46 may be connected to the swashplate 24 diametrically opposite to rods 44 and 46 to fully define the position of swashplate 24; however, such rods are not shown for the sake of simplicity and, in the absence of collective pitch commands, the swashplate may be assumed to tilt about a fixed geometric center. In a similar fashion, control rods 48 and 50 are connected to the stationary member 36 to control the position of swashplate 26.

At the opposite end of the rotor control linkages are the pilot's manually operated maneuver stick 52, a roll moment trim lever 54 and pitch moment trim lever 56. The stick 52 is connected to the airframe by means of yokes 58 for universal pivoting motion. When tilted in the fore and aft direction, stick 52 actuates rod 60, bellcrank 62, rod 64 and integrally connected longitudinal control rods 66 and 68. When the maneuver stick 52 is tilted left or right it actuates rod 70, bellcrank 72, rod 74, bellcrank 76, link 78, bellcranks 80 and 82, and lateral control rods 84 and 86. It will be noted that translation of bellcrank 82 by means of bellcrank 80 will cause rods 84 and 86 to move together while rotation of bellcrank 82 will cause rods 84 and 86 to move differentially.

The rods 66, 68, 84 and 86 are operatively connected to rods 46, 50, 48 and 44, respectively; however, the rod connections are broken to indicate that additional mixing linkage would be incorporated to add collective pitch commands from a pilot's collective control stick (not shown). Furthermore, hydraulic boost actuators and autopilot actuators might also be incorporated between these sets of rods. This additional mixing linkage and the actuators are not necessary to understand the invention and have been omitted for simplicity.

The fore and aft motions of the maneuver stick 52 consequently cause both swashplates 24 and 26 to tilt about lateral axes 88 and 90, respectively, and left or right motions of the stick cause the swashplates 24 and 26 to tilt about longitudinal axes 92 and 94, respectively.

The trim levers 54 and 56 are provided to mix the motions of both the paired longitudinal control rods 66 and 68 and lateral control rods 84 and 86 in preselected proportions for purposes to be described hereinafter. Roll moment trim lever 54 is connected by link 96 to a proportioning bar 98 which is in turn connected by link 100, bellcrank 102 to the rods 66 and 68 and by link 104, bellcrank 106 and link 108 to the rods 84 and 86. The pitch moment trim lever 56 is connected by link 110 to the proportioning bar 98 at a different position on the bar. The precise mixing proportion by which the trim levers 54 and 56 move the pairs of rods 66, 68 and 84, 86 will be determined by the separation between connecting points on the proportioning bar 98.

OPERATION

It will be noted in FIG. 1 that the push rods 34 and 42 will be displaced in the direction of blade rotation by an angle $\phi$ from the rods 46 and 50 carrying the pitch commands when the blades 19 and 21 are aligned with the longitudinal axes 92 and 94. It also follows that the push rods 34 and 42 will be similarly displaced from the rods 44 and 48 carrying the roll commands when the blades are aligned with the lateral axes 88 and 90. Brief reflection on this phase angle relationship between the swashplate inputs and the blades will indicate that a cross-coupling exists between the lateral cyclic commands for rolling and the longitudinal cyclic commands for pitching the aircraft. For example, blade 19 on the upper rotor is aligned with the lateral axis 88 and in this position would produce a pure aerodynamic roll moment. It will be recognized, however, that with the connection of rod 34 lying at a swashplate azimuth located at an angle $\phi$ from the lateral axis 88, the pitch of blade 19 is affected by both the rod 66 and rod 86. When the blade 19 and push rod 34 have rotated 90°, the blade 19 will be aligned with the longitudinal axis 92 and consequently the blade 19, although in a position to produce a pure aircraft pitching moment, will respond to both rod 66 and rod 86. There is, therefore, a cross-coupling between the pitch and roll command channels which means that a blade aligned with either of the lateral or longitudinal axes responds to both lateral and longitudinal cyclic pitch commands and, conversely, a pure lateral or longitudinal cyclic pitch command produces an aerodynamic moment having components about both the lateral and longitudinal axes.

This cross-coupling, properly phased, is precisely what is needed to produce a primary aerodynamic control moment directly from the given longitudinal or lateral cyclic pitch command and an additional aerodynamic moment corresponding to the coupled cyclic pitch command for opposing the gyroscopic precession moment which follows. Proper phasing is acquired by the angle $\phi$ leading the responding blade. Effectively, therefore, each attitude command automatically introduces an appropriately phased cyclic pitch command to generate an aerodynamic moment on the rotor blades which opposes the gyroscopic precession moment accompanying the commanded attitude change. Although the cyclic pitch commands can be analyzed separately, it will be understood that the two commands are actually superimposed to form a resultant third cyclic pitch command manifested in the resulting tilt of the swashplate.

The cross-coupling factor will be determined by the angle $\phi$ shown in FIG. 1. If the longitudinal cyclic pitch command for both rotors is represented by $A_1$ and the lateral cyclic pitch command for both rotors is represented by $B_1$, the lateral coupling factor, $A_1/B_1$, and the angle $\phi$ are related by the equation $\phi = \tan^{-1}(A_1/B_1)$. It will be noted that the longitudinal coupling factor and the lateral coupling factor are the same, i.e., the amount of lateral cyclic, $B_1$, coupled with a unit longitudinal cyclic is numerically equal to the amount of longitudinal cyclic, $A_1$, coupled with a unit lateral cyclic command. There is, therefore, reciprocal coupling between the lateral and longitudinal channels.

An analysis has shown that for gyroscopic precession moment cancellation the coupling factor is given by the relationship:

$$4m_0 K/\rho R c a I$$

where $m$ is the blade mass per unit span length, $m_0$ being the mass per unit length of the blade root;

$$K = \int_0^R \frac{m}{m_0} \gamma_w \frac{r}{R^2} dr$$

$\gamma_w$ is the variation of blade deflection with radius in the first blade bending mode,
R is the rotor radius,
$\rho$ is the air density,
c is the blade chord at 0.75R,
a is the blade section lift curve slope, and $$I = \int_0^R \gamma_w \frac{r^2}{R^3} dr$$

The coupling factor varies slightly with the forward speed or advance ratio of the rotor system; however, this variation is a second order variation and the formula as given is an accurate approximation for practical purposes.

Figure 2:
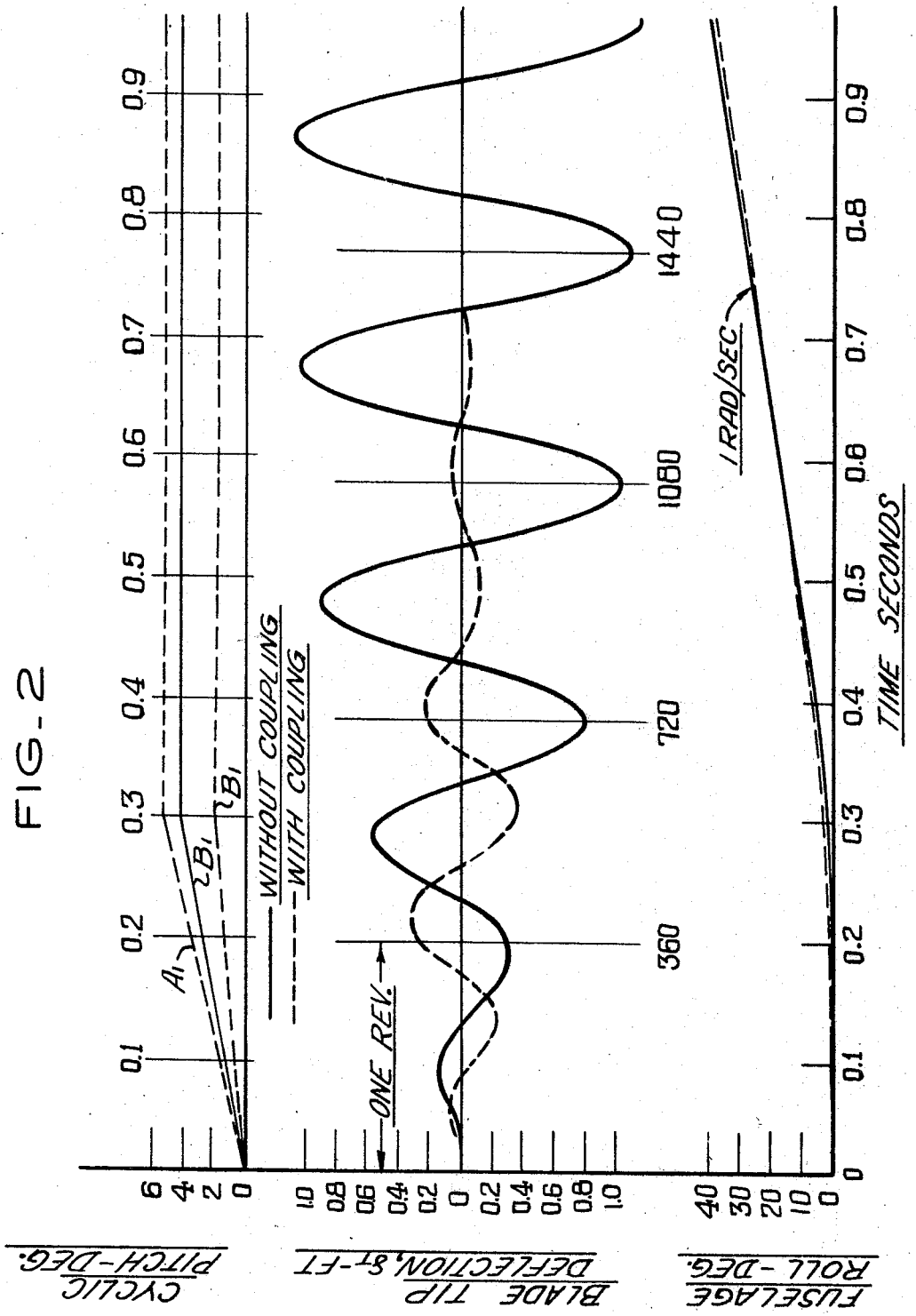
FIG. 2 is a set of graphs contrasting blade cyclic pitch, blade tip deflection and fuselage attitude angle for rotor systems with and without coupling.

The results of an analytical study of rotor blade deflection and fuselage attitude response of a helicopter with and without coupling are shown in the graphs of FIG. 2. The three graphs show, by way of example, the time history of cyclic pitch input commands, blade tip deflection for a rotor having a 20 ft. radius and fuselage roll angle during a roll maneuver in hover. The solid lines show the results without lateral to longitudinal coupling while the dotted lines show the results with coupling. The pilot's cyclic pitch input, $B_1$, without coupling is a ramp input requiring 0.3 second to reach the cyclic pitch necessary for a fuselage roll rate of 1 radian per second. The total tip deflection without coupled cyclic pitch is ±1.12 ft. In a coaxial rotor system, this blade tip deflection would require a minimum hub spacing of 2.24 ft. for this maneuver. The dotted lines represent the coupled system with a coupling factor of lateral cyclic pitch to longitudinal cyclic pitch, $B_1/A_1$, equal to 1/3. Note particularly that the coupled input, $A_1$, is three times larger than the primary input, $B_1$, although lighter rotors with smaller moments of inertia would generate smaller precession moments and require smaller coupled inputs. The cyclic pitch graph shows the coupled $A_1$ and $B_1$ ramp inputs for the same fuselage roll rate. The blade tip deflections of the coupled system occur only during the transient conditions, and reach a maximum of 0.36 ft. In a coaxial rotor system, this deflection would require a minimum hub spacing of only 0.72 ft. for this maneuver.

A comparison of the blade tip deflections for the systems with and without coupling reveal two significant facts. First of all, the maximum blade tip deflection of the coupled system has been reduced substantially. Secondly, the blade tip deflections in the coupled system are nil during the steady state roll due to cancellation of the gyroscopic precession moments. In the system without coupling blade tip deflections persist as long as the constant roll rate is maintained. The blade tip deflections, of course, are directly associated with the blade cyclic stresses and consequently the coupled system also removes the cyclic stresses accompanying a steady roll rate. The significant advantages of the coupled system are the reduction in blade deflection and blade cyclic stress without loss of fuselage roll response.

As discussed above, the coupling of the lateral and longitudinal cyclic pitch commands was accomplished in the embodiment of FIG. 1 by means of the phase angle $\phi$ which, once established by design, cannot be varied to remove the coupled input. A trim mechanism is necessary to genreate pure longitudinal or lateral rotor moments. The roll moment and pitch moment trim levers 54 and 56 are provided for this purpose and displace the rods 66 and 68 and rods 84 and 86 in a proportional relationship which effectively produces the pure cyclic pitch variation, i.e., no coupled input is introduced on either rotor. This proportional relationship is established by appropriate dimensions between the connections to the proportioning bar 98 and must be set in accordance with the coupling factor and the angle $\phi$. For a coupling factor of 3/1 represented in the graphs, the ratio of the dimensions between connections from left to right should be 0.36, 1.0, and 0.5 assuming other mechanical advantages are the same in the separate linkages from the bar 98 to the rods 46, 50 and rods 44, 48.

The trim levers permit pure lateral or pure longitudinal cyclic pitch to be imposed on the rotors when aerodynamic moments are desired but no gyroscopic precession moments are expected. For example, if the aircraft center of gravity is displaced along the longitudinal axis due to the presence of cargo in the aircraft, the pitch moment trim lever 56 is moved to produce a steady aerodynamic moment balancing the offset. A slightly different function is performed by the roll moment trim lever 56. It is sometimes desirable to produce equal but opposite rolling moments on the rotors and thereby laterally offset the individual rotor lift vectors on opposite sides of the aircraft as taught in U.S. Pat. No. 3,409,249 issued Nov. 5, 1968, to R. B. Bergquist et al. The trim lever 54 is connected through the mixing linkages to each of the rotors for this purpose.

While one embodiment of the invention has been shown and described, still other modifications may be made without departing from the scope and spirit of the invention. For example, although the coupling factor is introduced through the phase angle $\phi$ in the rotor head, the reciprocal, cross-coupling could be obtained by an appropriate mixing linkage located between the pilot's controls and the swashplates and interconnecting the lateral and longitudinal cyclic pitch control linkages. Such mixing linkages for coupling otherwise independent commands are known, as shown in U.S. Pat. No. 3,199,601 and the linkage between trim levers 54, 56 and rods 44, 46, 58, 50 is an actual example having different proportioning constants. It will be readily understood that with the coupling accomplished by such a mixing linkage, the aircraft motion from which the gyroscopic moments emanate need not be produced by the cyclic pitch variation of the rotors but instead may result from the actuation of another aircraft control surface such as an aileron or elevator operated from the maneuver stick 52. The invention, therefore, is not limited to the specific embodiments illustrated and described but may be used in other ways without departure from its spirit as defined by the following claims.

I claim:
1. Apparatus in an aircraft having two counterrotating, thrust-producing rotors composed of a plurality of pitch-adjustable blades comprising:
   (a) means including an aerodynamic thrusting surface for producing an aircraft motion about an axis of the aircraft other than the rotor axes; and
   (b) means responsive to the producing means and including the pitch-adjustable blades for inducing on each rotor an aerodynamic moment which reduces gyroscopic precession moments generated by the aircraft motion.

2. Apparatus according to claim 1 wherein the means for producing includes the pitch-adjustable blades of each of the rotors.

3. Apparatus according to claim 2 wherein the counterrotating rotors are coaxially mounted.

4. In an aircraft having a pair of counterrotating rotors with hingeless variable pitch blades for controlling motions of the aircraft about the aircraft control axes, apparatus including:
   (a) means for varying the pitch of the rotor blades to produce an aircraft motion about at least one of the control axes; and
   (b) means for producing aerodynamic moments on the rotors in opposition to gyroscopic precession moments generated by the aircraft motion.

5. Apparatus according to claim 4 wherein:
   (a) the means for varying varies the blade pitch of each rotor cyclically according to a first cyclic pitch command to produce the aircraft motion through rotor control moments; and
   (b) the means for producing correspondingly produces a second cyclic pitch command for each rotor, the second command having a 90° phase relationship with the first command and being superimposed on the first command to yield a resultant third cyclic pitch command.

6. In an aircraft having two counterrotating, thrust-producing rotors having rigidly extended, variable pitch blades, the combination of:
   (a) aircraft attitude control means for producing an angular motion of the aircraft about an axis orthogonal to the rotor axes including;
   (b) rotor control means connected to the rigidly extended, variable pitch blades for producing aerodynamic moments on the rotors to cancel induced gyroscopic precession moments on the counterrotating rotors.

7. The combination of claim 6 wherein the rotors are coaxially mounted.

8. In a helicopter having two counterrotating, lifting rotors, each rotor having a plurality of rigid, variable pitch blades, rotor controls including:
   (a) means for generating lateral and longitudinal cyclic pitch commands for each rotor; and
   (b) reciprocal coupling means connected between the generating means and the blades of each rotor for coupling the lateral cyclic pitch command into the longitudinal cyclic pitch command channel according to a preselected proportion and the longitudinal cyclic pitch command into the lateral cyclic pitch command channel according to the same proportion.

9. The controls of claim 8 wherein:
   (a) the generating means include a swashplate for each of the respective rotors, each swashplate having input members for receiving lateral and longitudinal commands and an output member rotatable with the respective rotor; and
   (b) the coupling means are interposed between the rotating members of the swashplates and the blades of the respective rotors.

10. The controls of claim 9 wherein the coupling means include connections from each blade to the rotating member of the respective swashplate, the connections from each blade being displaced in the plane of the swashplate by an angle $\phi$ from the longitudinal command input member when the corresponding blade is aligned with the longitudinal azimuth of the rotor.

11. The controls of claim 10 wherein the angle $\phi$ is a displacement ahead of the input member in the direction of blade rotation and is equal to an angle whose tangent is the preselected proportion.

12. The controls of claim 11 wherein the preselected proportion is given by the relationship:

$$4m_0K/\rho Rcal$$

where $m$ is blade mass per unit span length, $m_0$ being the mass per unit length of the blade root;

$$K = \int_0^R \frac{m}{m_o} \gamma_w \frac{r}{R^2} dr$$

$\gamma_w$ is the variation of blade deflection with radius in the first blade bending mode,
R is the rotor radius,
$\rho$ is the air density,
$c$ is the blade chord at 0.75R,
$a$ is the blade section lift curve slope, and $$I = \int_0^R \gamma_w \frac{r^2}{R^3} dr$$

13. In a helicopter having counterrotating lifting rotors with variable pitch blades, the combination including:
   (a) means for generating lateral and longitudinal cyclic pitch commands for the blades of each rotor; and
   (b) means operatively associated with the generating means for cross-coupling lateral and longitudinal cyclic pitch commands for the respective rotors in preselected proportions.

14. The combination of claim 13 wherein the preselected proportions are given by the relationship:

$$4m_0K/\rho Rcal$$

where $m$ is the blade mass per unit span length, $m_0$ being the mass per unit length of the blade root;

$$K = \int_0^R \frac{m}{m_o} \gamma_w \frac{r}{R^2} dr$$

$\gamma_w$ is the variation of blade deflection with radius in the first blade bending mode,
R is the rotor radius,
$\rho$ is the air density,
$c$ is the blade chord at 0.75R,
$a$ is the blade section lift curve slope, and $$I = \int_0^R w \frac{r^2}{R^3} dr$$

15. The combination of claim 13 further including trimming means for varying the lateral and longitudinal cyclic pitch commands independently.

16. The method of flying an aircraft having two counterrotating rotors with rigid, variable pitch blades including the steps of:
   (a) initiating an aircraft attitude change about an axis substantially normal to the rotor axes; and
   (b) inducing aerodynamic moments on each counterrotating rotor to oppose the gyroscopic precession moments applied to the rotors during the aircraft attitude change.

17. The method of claim 16 wherein:

(a) the attitude change is initiated by cyclic pitch variation of the blades on each rotor; and (b) the aerodynamic opposing moments are also produced by the cyclic pitch variation.

18. The method of flying an aircraft having a plurality of control surfaces including at least two counterrotating, lifting rotors with rigid, variable pitch blades, comprising the steps of:

(a) providing an aircraft attitude change command for at least one aircraft control surface to tilt the rotor axes in a given direction; and (b) coupling to the attitude change command a differential cyclic pitch command for the blades of both lifting rotors, the cyclic pitch command for each rotor having an azimuthal characteristic associated with a direction displaced 90° from the given direction to oppose gyroscopic precession moments on the rotors.

19. The method of claim 18 wherein the magnitude of the differential cyclic pitch command is selected in relation to the attitude change command to cancel gyroscopic precession moments generated on each rotor by the attitude change.

20. The method of reducing blade stress during maneuvering of a helicopter having two counterrotating rotors with rigidly mounted blades comprising the step of inducing on each rotor in accordance with the commanded aircraft maneuvers an aerodynamic moment to oppose gyroscopic precession stress.

21. The method of claim 20 wherein the aerodynamic moment is induced on the blades by cyclically varying the pitch of the blades on each rotor.

22. The method of claim 20 wherein the rotors are closely spaced, coaxially mounted rotors whereby the steps of inducing performs the additional function of reducing blade closure during maneuvers.

23. The combination of claim 6 wherein:

the rotor control means is an adjustable cyclic pitch control means connected to the blades of each rotor for producing the cancelling moments.

24. The rotor controls of claim 8 wherein:

(a) the generating means include:
(1) a pilot operated control member and
(2) a swashplate for each of the respective rotors, each swashplate having a stationary member for receiving the cyclic pitch commands and a rotatable member connected with the blades of the respective rotor; and (b) the coupling means includes a mixing linkage interposed between the pilot operated control member and the stationary members of the respective swashplates.

References Cited

UNITED STATES PATENTS

| | | | |
|---|---|---|---|
| 2,473,331 | 6/1949 | Donley | 170—135.26 |
| 3,102,597 | 9/1963 | Drees | 170—160.25 |
| 3,120,276 | 2/1964 | Culver et al. | 170—160.25 |
| 3,144,908 | 8/1964 | Pascher. | |
| 3,409,249 | 11/1968 | Bergquist et al. | |

FOREIGN PATENTS

| | | |
|---|---|---|
| 888,158 | 8/1943 | France. |
| 936,071 | 2/1948 | France. |

EVERETTE A. POWELL, JR., Primary Examiner

U.S. Cl. X.R.

416—33, 128